Figure 1:
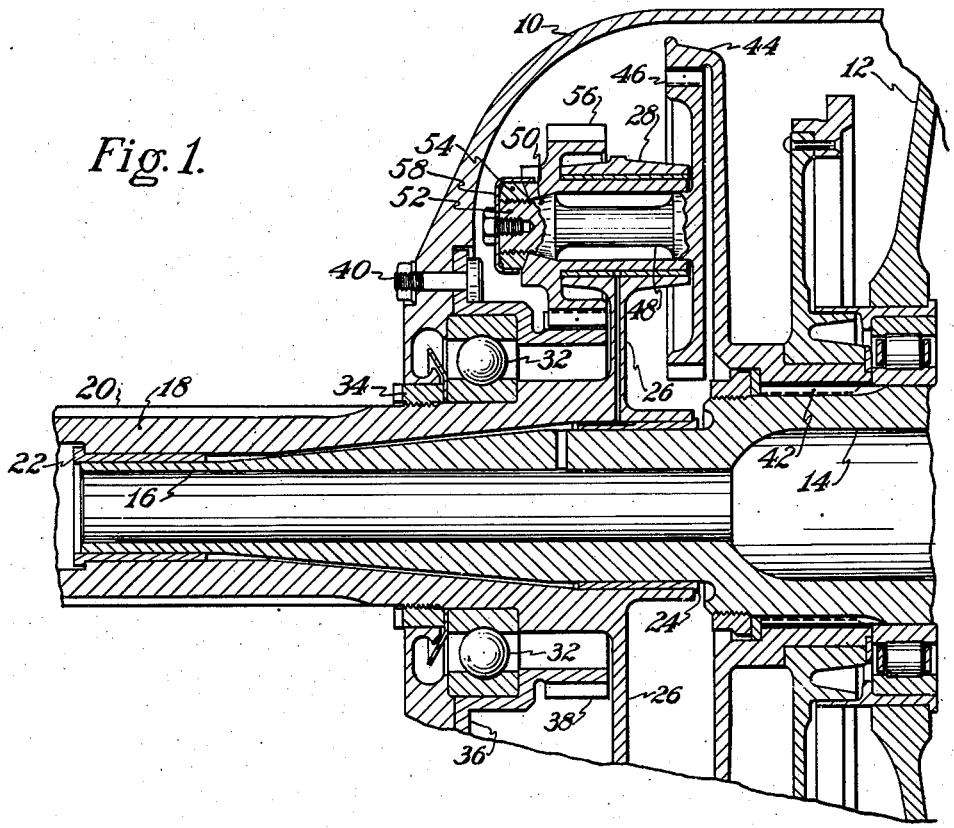

Oct. 12, 1937.   G. M. CORBIN   2,095,794
REDUCTION GEAR
Filed July 20, 1934

INVENTOR
GEORGE M. CORBIN.
BY
ATTORNEY

Patented Oct. 12, 1937

2,095,794

UNITED STATES PATENT OFFICE 2,095,794

REDUCTION GEAR

George M. Corbin, Paterson, N. J., assignor, by mesne assignments, to The Reed Propeller Co., Inc., Garden City, N. Y., a corporation of New York Application July 20, 1934, Serial No. 736,193

1 Claim. (Cl. 74—305)

This invention relates to reduction gears, and the specific showing of the drawing illustrates a gear suitable for aircraft engine propeller drives.

In certain respects the present invention comprises improvements on the invention disclosed under Patent No. 1,950,971, Roland Chilton, and in the drawing there is also included structure disclosed in Patent No. 1,864,170, Roland Chilton.

In the first mentioned patent there is disclosed a simplified form of planet cage so organized with respect to a planet pinion that the deflections in one member compensate for the deflections in the other, so as to maintain uniform contact across the width of the teeth, permitting the parts to be deliberately designed to give a substantial spring drive effect. While this structure has been in successful use for single step planetary gears, such gears have limitations as to the maximum reduction ratio obtainable. Beyond 1½ to 1 ratio the pinions become undesirably small if the ring gear be used as the driver, as is desired in order to obtain low tooth loads. Also, a ratio of about 4:3 is as near to unity as can be conveniently obtained with the single step gears, because the sun gear diameter becomes too small to accommodate the necessary size of propeller shaft.

Accordingly, objects of the present invention include the provision of a simple and improved self-aligning means applicable to compound planetary reduction gears, that is to say, gears wherein two pinions (usually of different diameters) mesh with the sun gear and the ring gear respectively. Such a gear affords a very much wider range in available ratios than the non-compounded type, while retaining the advantages of low tooth pressures which are inherent in planetary gears when the ring gear is the driver.

In the single-step planetary gears it is of advantage to provide the maximum number of pinions that can be accommodated and as many as six pinions are often used. For assembly reasons it is necessary, however, that the number of teeth in the pinion mating gears be a multiple of the number of planet arms in order that these may be equally spaced, and this comprises a limitation in the selection of tooth numbers whereby the number of ratios within the available range is limited. In conventional compound gears wherein two sets of mating teeth must factorize, these limitations are accentuated and there is the additional difficulty that an identical timing relation must be maintained between specific teeth of the two gears comprising each planet pinion. Any inaccuracies in this relation or in the spacing of the planet cage bearings, will result in one pinion taking an undue proportion of the load and, in fact, if the tooth relationship error exceeds the tooth back-lash, it will prevent the gear being assembled at all. The Patent No. 1,864,170 discloses a slippable connection for planet or layshaft gears whereby the parts, after initial assembly, may be submitted to sufficient load to slip the driving connection in each pinion, thus automatically assuring uniform load distribution, whereupon the connections may be fully tightened against possibility of slippage in service. This provision is of particular advantage in the compound planetary gear of the present invention.

Another object of the present invention is to provide a spring drive means between the compound planet pinions whereby overloading, as from inaccuracies in the teeth, is absorbed.

Figure 2:
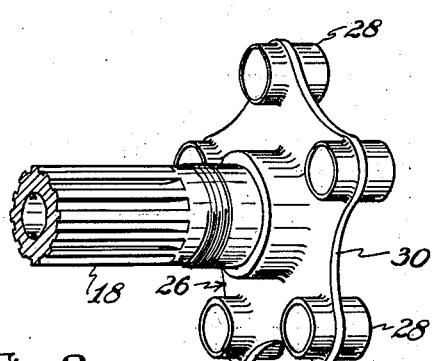

In the drawing:

Fig. 1 is a fragmentary axial section through the nose of an engine incorporating the gear of this invention; and Fig. 2 is a perspective view of the planet carrier and propeller shaft member.

Referring first to Fig. 1—10 designates a nose or gear case attached to a front wall of the usual crankcase 12. A crankshaft 14 has a forward extension or pilot 16 on which is mounted a propeller shaft 18 splined at 20 to take a conventional propeller hub and provided with bushings 22, 24, on which the propeller shaft 18 is free to rotate on the crankshaft extension 16. The propeller shaft is further provided with a disc or web 26 from which bosses 28 project on either side as shown. This member may be scalloped circumferentially, as indicated at 30, Fig. 2, to comprise arms for the support of the bosses 28.

The member 18, 26, is supported in the propeller thrust bearing 32, the inner race of which is clamped by a nut 34 in the usual way. The outer race is clamped in the nose or gear case 10 by an extension 36 of a fixed or sun gear 38 which is secured by bolts 40.

Splined to the crankshaft 14 is a hub 42 of an annular driving gear 44. Meshed with this driving gear 44 is a large planet pinion 46 integral with a relatively slender shaft 48 provided with a taper end 50 and a threaded extension 52 engaged by a nut 54, by which a smaller planet pinion 56 is clamped over the taper end 50 for unitary rotation with the gear 46. The end of the shaft 48 nearest to the pinion 46 is piloted in the hollow shaft carrying the pinion 56, said hollow shaft being borne in the boss 28. The pinion 56 meshes with the sun gear 38. The axial spacing of the planet pinions 46, 56, with respect to the relatively thin web 26 is such that the resultant of the tooth loads on these pinions falls substantially on the neutral axis of web whereby this member is relieved of substantial bending loads. Stated in another way, the diameter of the gear 46 bears a relation to its axial distance from the web 26 similar to the relation of the diameter of the gear 56 to its axial distance from the web 26. It will be seen that the thin member 26 of the form indicated in Fig. 2 will have great strength to resist the tangential driving loads to which it is subject, but that it will be flexible for slight angulation of the gear axis out of the plane of the section of Fig. 1 whereby the appropriate distribution of load between the pinion teeth 46, 56, is assured in spite of the usual small errors in fabrication. This effect is further enhanced by the torsional yield of the slender shaft 48 which gives an appreciable spring drive effect.

On assembly of a particular set of gears, the teeth of gears 44, 46 and 38, 56 are meshed at random (which would be impossible if the gears 56, 46 were rigidly connected, as by splines). The nuts 54 are then partly tightened until a substantial load is necessary to slip the taper connections 50. Such a driving load is then applied to the assembly and slight slippage is enforced to bring all planet pinions into equal contact with their mating gears, whereupon the nuts 54 are completely tightened and secured by locking member 58 each engaging both the nut and gear 56 as shown. The hand of the threads in the nuts 54 is preferably selected so that should any slippage in operation of the connections 50 occur it will be in the direction of tightening the nut through the locking device 58.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

What is claimed is:

In a reduction gear, a planet-carrying disc having a bearing adjacent its periphery, the bearing axis being parallel to the disc axis, a hollow shaft rotatable in said bearing having a pinion integral therewith, the pinion lying to one side of said disc, a torsionally resilient shaft piloted in said hollow shaft and having a second pinion extending therefrom on the side of said disc other than that on which said first pinion lies, said pinions being axially spaced from said disc a distance directly proportional to their respective pitch diameters, and an adjustable driving connection between the anti-pinion end of said resilient shaft and the pinion end of said hollow shaft.

GEORGE M. CORBIN.